2,990,215
TAIL GATE MOUNTING FOR
AUTOMOTIVE VEHICLES
Vivian Gordon May, Kalamazoo, Mich., assignor to
Checker Motors Corporation, Kalamazoo, Mich.
Filed June 29, 1959, Ser. No. 823,486
6 Claims. (Cl. 296—57)

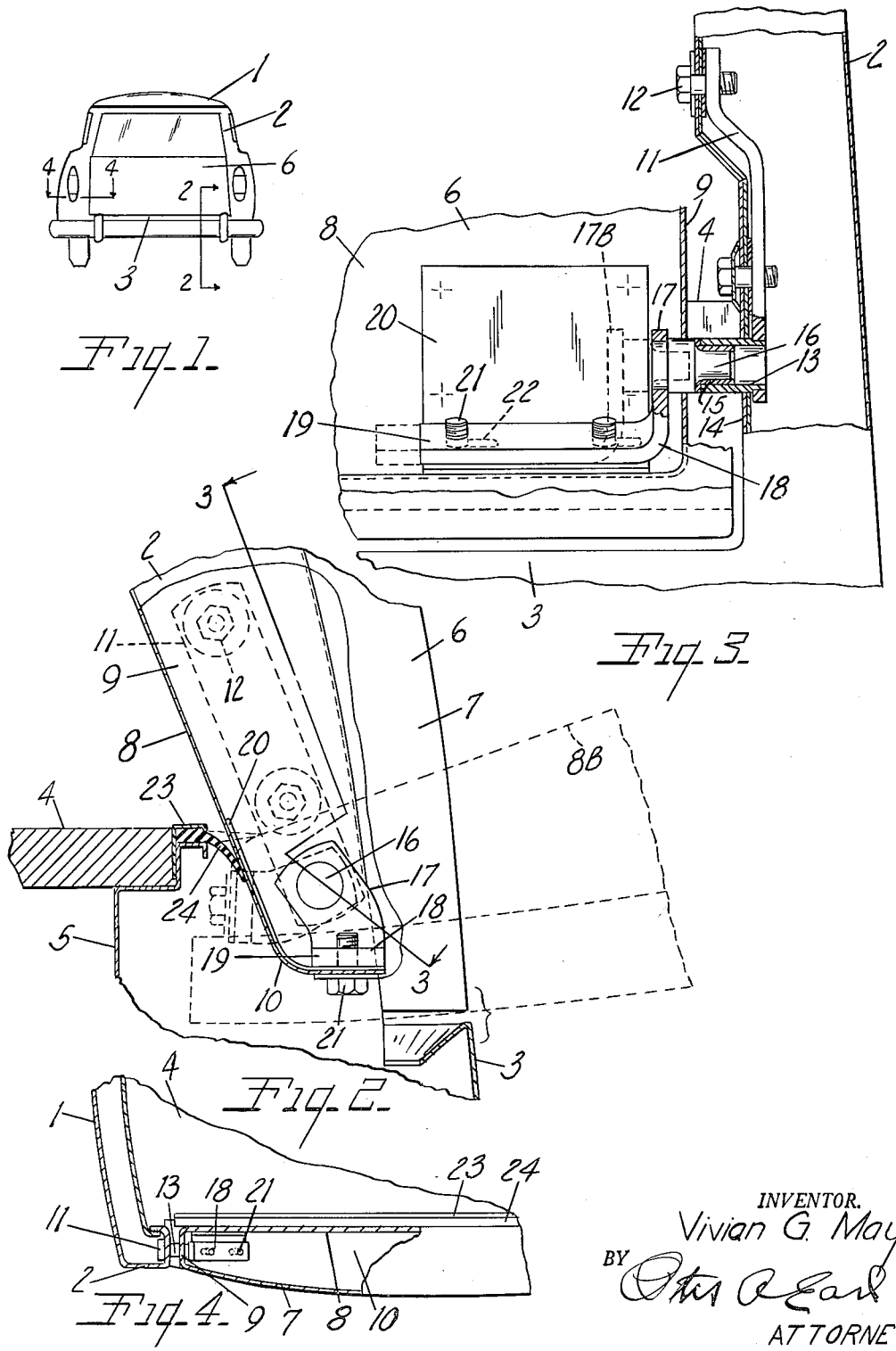

This invention relates to tail gate mounting for automotive vehicles. The principal objects of this invention are:

First, to provide a tail gate mounting for automotive vehicles of the type known as station wagons in which the tail gate is swingably supported upon pin type pintle bearings at each end of the gate to swing between a closed position in conforming contour to the exterior surface of the vehicle and an open position with its inner surface in closely adjacent continuing relation to the surface of a deck within the vehicle.

Second, to provide a tail gate mounting in which the gate swings between open and closed positions at the rear edge of an interior deck panel with a flexible sealing strip secured along the rear edge of the deck panel to engage and seal against the surface of the gate in both the open and closed positions of the gate.

Third, to provide a pintle bearing mounting for swingably supporting a tail gate in an opening in the back of a vehicle in which the movable part of the pintle bearing is adjustably connected to its supporting part for movement along the axis of the bearing to permit engagement of the pintle bearing parts with the gate in position in the body opening.

Fourth, to provide a tail gate mounting for a station wagon in which the exterior surface of the gate can be convexly curved in conforming relation to the adjacent body parts of the vehicle while the inner surface of the gate can be flat and function as a continuation of an inner deck of the vehicle without requiring a hinge element projecting beyond the exterior surface of the vehicle.

Other objects and advantages of the invention will be apparent from a consideration of the following description and claims. The drawings, of which there is one sheet, illustrate a highly practical form of the tail gate structure and mounting.

FIG. 1 is a rear elevational view of a station wagon type of automotive vehicle with the tail gate of the invention installed therein.

FIG. 2 is a fragmentary vertical cross sectional view taken along the plane of the line 2—2 in FIG. 1.

FIG. 3 is a fragmentary transverse cross sectional view taken along the plane of the broken line 3—3 in FIG. 2.

FIG. 4 is a fragmentary horizontal cross sectional view taken along the plane of the line 4—4 in FIG. 1.

The station wagon 1 illustrated in general outline in FIG. 1 is provided with a body having rear corner pillars 2 and a lower rear body panel 3 defining a rear door opening in the vehicle as is common. Within the vehicle body there is provided a rear platform or deck 4 supported upon suitable supporting plates 5 and terminating in upwardly and inwardly spaced relation to the upper edge of the rear body panel 3. As appears most clearly from FIG. 2 the rear body panel 3 can be exteriorly convex as part of the streamline or artistic design of the vehicle body.

The tail gate indicated generally at 6 for closing the lower portion of the door opening is of hollow double walled construction having a rearwardly convex outer panel 7 and a generally flat inner panel 8 connected by suitable side edge walls 9 and a bottom edge wall 10. As stated the rear wall or panel 7 of the tail gate is shaped in conforming continuing relation to the rear body panel 3 and the surface of the pillars 2.

Fixedly secured within the rear corner pillars 2 are a pair of bracket plates 11 which are clamped against the transversely inner side walls of the pillars by cap screws 12 passed through the pillar walls and engaged with the bracket plates. A tubular pintle bearing support 13 is fixedly secured to the lower end of each bracket plate and projects transversely inwardly of the door opening through a hole provided therefore in the inner side wall 14 of the pillar. The tubular bearing 13 may enclose and support an antifriction sound deadening bearing such as the nylon bushing 15. The bushing 15 and bearing support 13 rotatably receive and support a pintle pin 16 secured to and projecting laterally from the upstanding arm 17 of an angle bracket 18 having its lower arm 19 disposed upon the lower edge wall 10 of the tail gate. Where necessary the inner wall 8 and edge wall 10 of the tail gate can be stiffened by a reinforcing plate 20 welded thereto. The pintle pin 16 projects laterally through a hole provided therefor in the side edge wall 9 and the attaching arm 19 of the angle bracket defines screw holes for receiving the threaded shank of capped screws 21.

The lower edge wall 10 and the reinforcing plate 20 define transverse slots 22 passing the shanks of the screws 21 so that the angle brackets and pintle pins 16 can be moved transversely inwardly to the inwardly displaced position shown by dotted lines at 17B in FIG. 3 as the tail gate is moved into position in the door opening of the vehicle. The pintle pin 16 can then be moved transversely outwardly into engagement with the pintle bearings 15 and the angle brackets clamped in place by tightening the cap screws 21.

With particular reference to FIG. 2 it will be noted that the axis of the pintle pins 16 and bearings 15 is disposed upwardly and inwardly of the lower edge of the door opening and upwardly and inwardly from the lower rear edge of the tail gate 6. At the same time the axis of the pintle bearing is disposed below and rearwardly from the rear edge of the deck panel 4. The lower edge of the inner tail gate panel at its junction with the lower edge wall 10 is eccentric to the axis of the pintle bearings 15—16 by a distance slightly less than the distance from the bearing axis to the rear edge of the deck 4 so that in swinging from the closed position shown in full lines to the open position shown in dotted lines at 8B in FIG. 2, the lower edge of the inner panel of the tail gate will swing in clearing by closely spaced relation to the deck 4. The rear edge of the deck is provided with a channel forming strip 23 that receives and retains a rubber or other flexible seal strip 24 having a rearwardly tapered edge that contacts and seals against the inner panel of the tail gate in both the open and closed positions of the gate. The gate is thus easily installed in the vehicle and is movable between open and closed positions with a seal projecting continuously between the interior deck and the inner surface of the tail gate in both opened and closed positions.

What is claimed as new is:
1. A tail gate assembly in a vehicle having rear corner pillars and a rearwardly bowed exterior body panel extending therebetween with an inner deck fixed within the vehicle in upwardly and inwardly spaced relation from the upper edge of said body panel, said assembly comprising bracket plates mounted in said pillars and having tubular pintle bearings thereon opening in alined relation transversely of the vehicle above and forwardly of said upper edge of said body panel, a tail gate having a flat inner panel and an outwardly convex outer panel connected together by edge walls, said outer panel being conformed to lie in closely spaced continuing relation to the surfaces of said back panel and said pillars in the closed position of the gate, said inner panel having a straight lower edge, angle brackets having attaching arms disposed on the inner side of the lower edge wall of said gate adjacent the ends thereof and having threaded screw holes therein, headed screws passed through transversely elongated slots provided in said lower edge wall and engaged in said screw holes to adjustably clamp said angle brackets in said gate, upstanding arms on the laterally outer ends of said angle brackets having laterally outwardly projecting pintle pins thereon extending through holes provided therefor in the side edge walls of said gate and pivotally received and supported in said bearings, and a flexible sealing strip secured along the rear edge of said deck and yieldably engaged and deflected by said inner panel in the closed position of said gate, the lower edge of said inner panel being spaced radially from the axis of said bearings slightly less than the distance of the rear edge of said deck from the same axis whereby said sealing strip rests upon said inner panel in the open position of said gate.

2. A tail gate assembly in a vehicle having hollow rear corner pillars and a rearwardly bowed exterior body panel extending therebetween with an inner deck fixed within the vehicle in upwardly and inwardly spaced relation from the upper edge of said body panel, said assembly comprising bracket plates mounted in said pillars and having tubular pintle bearings thereon opening in alined relation transversely of the vehicle above and forwardly of said upper edge of said body panel, a hollow tail gate having a flat inner panel and an outwardly convex outer panel connected together by edge walls, said outer panel being conformed to lie in closely spaced continuing relation to the surfaces of said back panel and said pillars in the closed position of the gate, said inner panel having a straight lower edge, angle brackets having attaching arms disposed on the inner side of the lower edge wall of said gate adjacent the ends thereof and having threaded screw holes therein, headed screws passed through transversely elongated slots provided in said lower edge wall and engaged in said screw holes to adjustably clamp said angle brackets in said gate, upstanding arms on the laterally outer ends of said angle brackets having laterally outwardly projecting pintle pins thereon extending through holes provided therefor in the side edge walls of said gate and pivotally received and supported in said bearings, and a flexible sealing strip secured along the rear edge of said deck and yieldably engaged and deflected by said inner panel in the closed position of said gate, the lower edge of said inner panel being spaced radially from the axis of said bearings by less than the distance of the rear edge of said deck from the same axis whereby said sealing strip rests upon said inner panel in the open position of said gate.

3. A tail gate assembly in a vehicle having hollow rear corner pillars and a rearwardly bowed exterior body panel extending therebetween with an inner deck fixed within the vehicle in upwardly and inwardly spaced relation from the upper edge of said body panel, said assembly comprising bracket plates mounted in said pillars and having pintle bearings thereon positioned in alined relation transversely of the vehicle above and forwardly of said upper edge of said body panel, a hollow tail gate having a flat inner panel and an outwardly convex outer panel connected together by edge walls, said outer panel being conformed to lie in closely spaced continuing relation to the surfaces of said back panel and said pillars in the closed position of the gate, said inner panel having a straight lower edge, angle brackets having attaching arms disposed on the inner side of the lower edge wall of said gate adjacent the ends thereof, headed screws passed through transversely elongated slots provided in said lower edge wall to adjustably clamp said angle brackets in said gate, upstanding arms on the laterally outer ends of said angle brackets having laterally outwardly projecting pintles thereon extending through holes provided therefor in the side edge walls of said gate and pivotally supported by said bearings, and a flexible sealing strip secured along the rear edge of said deck and yieldably engaged and deflected by said inner panel in the closed position of said gate, the lower edge of said inner panel being spaced radially from the axis of said bearings by less than the distance of the rear edge of said deck from the same axis whereby said sealing strip rests upon said inner panel in the open position of said gate.

4. A tail gate assembly in a vehicle having rear corner pillars and a rearwardly bowed exterior body panel extending therebetween with an inner deck fixed within the vehicle in upwardly and inwardly spaced relation from the upper edge of said body panel, said assembly comprising mounting plates mounted in said pillars and having pintle bearings thereon disposed in alined relation transversely of the vehicle above and forwardly of said upper edge of said body panel, a tail gate having a flat inner panel and an outwardly convex outer panel connected together by edge walls, said outer panel being conformed to lie in closely spaced continuing relation to the surfaces of said back panel and said pillars in the closed position of the gate, said inner panel having a straight lower edge spaced upwardly and inwardly from the lower edge of said outer panel, mounting brackets secured to said tail gate and having pintles supported by said bearings, and a flexible sealing strip secured along the rear edge of said deck and yieldably engaged and deflected by said inner panel in the closed position of said gate, the lower edge of said inner panel being spaced radially from the axis of said bearings slightly less than the distance of the rear edge of said deck from the same axis whereby said sealing strip rests upon said inner panel in the open position of said gate.

5. A tail gate assembly in a vehicle having hollow rear corner pillars and a rearwardly bowed exterior body panel extending therebetween, said assembly comprising bracket plates mounted in said pillars and having pintle bearings thereon disposed in alined relation transversely of the vehicle and projecting through the inner side walls of the pillars above and forwardly of said upper edge of said body panel, a tail gate having a flat inner panel and an outwardly convex outer panel connected together by edge walls, said outer panel being conformed to lie in closely spaced continuing relation to the surfaces of said back panel and said pillars in the closed pisition of the gate, angle brackets having attaching arms disposed on the inner side of the lower edge wall of said gate adjacent the ends thereof and having threaded screw holes therein, headed screws passed through transversely elongated slots provided in said lower edge wall and engaged in said screw holes to adjustably clamp said angle brackets in said gate, upstanding arms on the laterally outer ends of said angle brackets having laterally outwardly projecting pintles thereon extending through holes provided therefor in the side edge walls of said gate and pivotally supported by said bearings.

6. A tail gate assembly in a vehicle having hollow rear corner pillars and a rearwardly bowed exterior body panel extending therebetween, said assembly comprising bracket plates mounted in said pillars and having first bearing elements thereon disposed in alined relation transversely of the vehicle above and forwardly of said upper edge of said body panel and exposed through openings in the sides of said pillars, a tail gate having an inner panel and an outwardly convex outer panel connected together by edge walls, said outer panel being conformed to lie in closely spaced continuing relation to the surfaces of said back panel and said pillars in the closed position of the gate, angle brackets having attaching arms disposed on the inner side of the lower edge wall of said gate adjacent the ends thereof and having threaded screw holes therein, headed screws passed through transversely elongated slots provided in said lower edge wall and engaged in said screw holes to adjustably clamp said angle brackets in said gate, upstanding arms on the laterally outer ends of said angle brackets having laterally outwardly projecting bearing elements thereon extending through holes provided therefor in the side edge walls of said gate and pivotally engaged with said first bearing elements.

References Cited in the file of this patent

UNITED STATES PATENTS

| | | |
|---|---|---|
| 2,610,083 | Keller | Sept. 9, 1952 |
| 2,821,431 | Crompton | Jan. 28, 1958 |